US011919812B2

(12) United States Patent
Rampinelli et al.

(10) Patent No.: US 11,919,812 B2
(45) Date of Patent: Mar. 5, 2024

(54) CEMENTITIOUS MIXTURE FOR A 3D PRINTER AND RELATIVE USE IN SAID PRINTER

(71) Applicant: HConnect 2 GmbH, Heidelberg (DE)

(72) Inventors: Flavio Rampinelli, Urgnano (IT); Chiara Rossino, Seriate (IT); Martina Palomba, Casalnuovo di Napoli (IT)

(73) Assignee: H2CONNECT 2 GMBH, Heidelberg (DE)

( * ) Notice: Subject to any disclaimer, the term of this patent is extended or adjusted under 35 U.S.C. 154(b) by 435 days.

(21) Appl. No.: 17/259,665

(22) PCT Filed: Jul. 16, 2019

(86) PCT No.: PCT/IB2019/056053
§ 371 (c)(1),
(2) Date: Jan. 12, 2021

(87) PCT Pub. No.: WO2020/016768
PCT Pub. Date: Jan. 23, 2020

(65) Prior Publication Data
US 2021/0317042 A1    Oct. 14, 2021

(30) Foreign Application Priority Data
Jul. 17, 2018 (IT) .......................... 102018000007262

(51) Int. Cl.
*C04B 28/08* (2006.01)
*B28B 1/00* (2006.01)
(Continued)

(52) U.S. Cl.
CPC ............ *C04B 28/082* (2013.01); *B28B 1/001* (2013.01); *B33Y 10/00* (2014.12); *B33Y 30/00* (2014.12);
(Continued)

(58) Field of Classification Search
CPC ..... C04B 28/082; C04B 14/28; C04B 18/021; C04B 24/02; C04B 24/2641;
(Continued)

(56) References Cited

U.S. PATENT DOCUMENTS 5,674,929 A * 10/1997 Melbye ................ C04B 24/267
524/277
7,641,461 B2    1/2010 Khoshnevis
(Continued)

FOREIGN PATENT DOCUMENTS

CN        104310918 A    1/2015
CN    201510838044 A   11/2015
(Continued)

OTHER PUBLICATIONS

Database WPI Week 201724 Thomson Scientific, London GB; AN 2017-00891M, XP002789357, & CN 106 242 398 A (Jiang X) Dec. 21, 2016.
(Continued)

Primary Examiner — Brian D Mattei
Assistant Examiner — Omar F Hijaz
(74) Attorney, Agent, or Firm — Florek & Endres PLLC

(57) ABSTRACT

A cementitious mixture for a 3D printer and its relative use are described, more specifically for the production of finished products having a complex geometry using a 3D printing apparatus.

18 Claims, 4 Drawing Sheets

(51) Int. Cl.
| | |
|---|---|
| *B33Y 10/00* | (2015.01) |
| *B33Y 30/00* | (2015.01) |
| *B33Y 40/10* | (2020.01) |
| *B33Y 70/00* | (2020.01) |
| *C04B 14/28* | (2006.01) |
| *C04B 18/02* | (2006.01) |
| *C04B 24/02* | (2006.01) |
| *C04B 24/26* | (2006.01) |
| *C04B 24/38* | (2006.01) |
| *C04B 24/42* | (2006.01) |
| *C04B 103/32* | (2006.01) |
| *C04B 111/00* | (2006.01) |
| *C04B 111/34* | (2006.01) |

(52) U.S. Cl.
CPC ............... *B33Y 40/10* (2020.01); *B33Y 70/00* (2014.12); *C04B 14/28* (2013.01); *C04B 18/021* (2013.01); *C04B 24/02* (2013.01); *C04B 24/2641* (2013.01); *C04B 24/383* (2013.01); *C04B 24/42* (2013.01); *C04B 2103/32* (2013.01); *C04B 2111/00129* (2013.01); *C04B 2111/00181* (2013.01); *C04B 2111/34* (2013.01)

(58) Field of Classification Search
CPC ... C04B 24/383; C04B 24/42; C04B 2103/32; C04B 2111/00129; C04B 2111/00181; C04B 2111/34; C04B 28/06; C04B 28/065; C04B 28/04; B28B 1/001; B28B 3/20; B33Y 10/00; B33Y 30/00; B33Y 40/10; B33Y 70/00; Y02W 30/91; B29C 64/106
See application file for complete search history.

(56) References Cited

U.S. PATENT DOCUMENTS

| | | | | |
|---|---|---|---|---|
| 7,753,642 | B2 | 7/2010 | Bosscher | |
| 7,837,378 | B2 | 11/2010 | Khoshnevis | |
| 7,878,789 | B2 | 2/2011 | Khoshnevis | |
| 10,472,529 | B2* | 11/2019 | Lee | C09D 11/328 |
| 11,390,031 | B2* | 7/2022 | De Pena | B29C 64/35 |
| 2007/0284104 | A1* | 12/2007 | Beckman | C04B 28/02 106/804 |
| 2009/0197991 | A1* | 8/2009 | Bury | C04B 40/0039 106/659 |
| 2013/0139729 | A1* | 6/2013 | Ong | C04B 16/00 106/697 |
| 2013/0216762 | A1* | 8/2013 | Chan | D21H 21/34 428/70 |
| 2014/0216533 | A1* | 8/2014 | Alfani | B29C 33/56 428/141 |
| 2014/0252672 | A1 | 9/2014 | Rael | |
| 2016/0319072 | A1* | 11/2016 | Kraus | C04B 24/32 |
| 2018/0009172 | A1* | 1/2018 | Amba | B33Y 30/00 |
| 2019/0009428 | A1* | 1/2019 | Dienemann | B28B 1/001 |
| 2019/0194072 | A1* | 6/2019 | Esnault | B33Y 70/10 |
| 2019/0276364 | A1* | 9/2019 | Sautreuil | C04B 14/28 |

FOREIGN PATENT DOCUMENTS

| | | | |
|---|---|---|---|
| CN | 106242398 A | 12/2016 | |
| EP | 3421201 A1 | 1/2019 | |
| FR | 2964379 A1 * | 3/2012 | ............ C04B 14/02 |
| WO | 2013/037792 A1 | 3/2013 | |
| WO | WO-2013037792 A1 * | 3/2013 | ............ B28B 7/364 |
| WO | 2017/050421 A1 | 3/2017 | |

OTHER PUBLICATIONS

Gosselin C et al.: "Large-scale 3D printing of ulta-high performance concrete—a new processing route for architects and builders", Materials and Design, Elsevier, Amsterdam, NL, vol. 100, Mar. 25, 2016 pp. 10-109, XP029513521, ISSN: 0264-1275, DOI: 10.1016/JMatdes.2016.03.097.

Le T T et al: Mix design and fresh properties for high-performance printing concrete, Materials and Structures, Kluwer Academic Publishers, Do., vol. 45, No. 8, Jan. 19, 2012, pp. 1221-1232, XP035082641, ISSN: 1871-6873, DOI: 10.1617/S11527-012-9828-Z.

Eidel, Clemence, "International Search Report and Written Opinion of the International Written Authority for International Patent Application No. PCT/IB2019/056053," European Patent Office, dated Nov. 19, 2020.

De Gregori, Antonella, "Response to Written Opinion of the IPEA for International Application No. PCT/IB2019/056053", Aug. 5, 2020; and Crowley, M et al. (2007) "Pharmaceutical Applications of Hot-Melt Extrusion: Part 1," Drug Developments and Industrial Pharmacy, 33:9, 909-926 DOI:10.1080/03639040701498759.

Wray Peter, "Additive manufacturing-Turning manufacturing inside out" American Ceramic Society Bulletin, vol. 93, No. 3 | www.ceramics.org | Apr. 14, 2014.

G. Huesken, H.J.H. Brouwers, "On the early-age behavior of zero-slump concrete," Cement and Concrete Research 42 (2012) 501-510.

ASTM International, "Designation: F2792-12a, Standard Terminology for Additive Manufacturing Technologies" Sep. 9, 2013.

R.A. Buswell, R.C. Soar, A.G.F. Gibb, A. Thorpe, "Freeform Construction: Mega-scale Rapid Manufacturing for construction," Automation in Construction 16 (2007) 224-231.

S. Lim, R. A. Buswell, T. T. Le, S. A. Austin, A. G. F. Gibb, and T. Thorpe, "Developments in construction-scale additive manufacturing processes," Automation in Construction 21 (2012) 262-268.

T. T. Le, S. A. Austin, S. Lim, R. A. Buswell, A. G. F. Gibb, T. Thorpe "Mix design and fresh properties for high-performance printing concrete," Materials and Structures 45 (2012) 1221-1232.

D Hwang, B Khoshnevis, "Concrete Wall Fabrication by Contour Grafting," Daniel J. Epstein Department of Industrial & Systems Engineering University of Southern California, 2006.

Khoshnevis, B., Hwang, D., Yao, K-T. and Yeh, Z. (xxxx) Mega-scale fabrication by contour crafting, Int. J. Industrial and Systems Engineering, vol. x, No. x, pp. xxx-xxx.

Khoshnevis, B., "Automated construction by contour crafting-related robotics and information technologies," Automation in Construction 13 (2004) 5-19.

Frankson, Liesl, "Printing your dream house," Innovations in Construction (2015) IMIESA vol. 40 No. 4 p. 33-34.

* cited by examiner

CEMENTITIOUS MIXTURE FOR A 3D PRINTER AND RELATIVE USE IN SAID PRINTER

The present invention relates to a cementitious mixture for a 3D printer and its use, more specifically for the production of finished products having a complex geometry, by means of a 3D printing apparatus.

The present invention falls within the field of cementitious mixtures or compositions to be used, by means of 3D printing technologies, for the production of three-dimensional products, in particular by means of 3D extrusion printing. Mechatronics has reached a high level of pervasion in various industrial sectors, where robotic production has now been a consolidated process for several years. Additive Manufacturing (AM) is becoming increasingly important in the field of rapid prototyping. There are examples of the use of this technology for the production of complex parts, especially in the case of objects for which a production in a large number of copies is not necessary, not only for example for dental implants or jewelry, but also for the production of chromium-cobalt nozzles for fuel, printed by General Electric for the new LEAP jet engines of the Airbus group A320 [1].

This technology is particularly advantageous when the products can be obtained directly from the digital model, with an absolutely reduced use of additional support material that is inevitably wasted after finishing the object.

Various techniques in the field of additive manufacturing allow the use of different materials, such as thermoplastic resins that can melt/harden in a limited range of temperatures, photo-crosslinkable resins that are hardened by means of a laser beam or metal powders that melt. using a laser beam and harden immediately after the passage of the laser.

The International Technical Committee on Additive Manufacturing ASTM F42 defines additive manufacturing as the "process of joining materials to create objects starting from 3D model data, usually layer by layer, as opposed to subtractive production methods" (this definition is object of ISO harmonization according to ISO 17296-1) [2].

Cement-based materials have also been introduced into the field of additive manufacturing. These are materials that behave completely differently with respect to the other materials mentioned above and normally used in this type of technology. The characteristics required for a cement mix or composition to be used as material for AM must clearly take into consideration the typicality of the printing process.

Additive manufacturing technologies in the cement sector can be used in various fields, including architecture, building, art and design. These technologies have recently attracted a growing interest in the building industry, an interest that derives mainly from the possibility of offering more freedom in the design of complex shapes, with potential aesthetic and functional advantages, reducing production times and costs [3]. Before printing any object, however, a 3D model must be created using appropriate software. The 3D model is divided into a certain number of layers which then correspond to the different deposition layers provided by the AM process. These steps require specific skills, which are not common in industrial building and an error in the implementation phase of the 3D model inevitably leads to an error in production.

Among the existing techniques that apply the additive manufacturing technology, extrusion 3D printing seems to be the one with the greatest potential for development in the building industry. This technique generally provides at least one print head to which a nozzle, generally pressurized, is mounted. The print head is fed with a cementitious mixture and driven by motors at precise points in space, following a 3D model of the object to be printed.

The speed with which the material is extruded through the nozzle and the speed with which the print head moves in space are some of the design parameters that determine the final print resolution. The nozzle is piloted to trace the paths in space that allow the object, represented digitally, to be reproduced. As the material exits from the nozzle, it is placed on the surface of the object under construction and the construction itself of the object then proceeds in the form of a succession of superimposed layers, in a vertical direction, until the entire object has been constructed.

Conceptually, the whole printing process can be divided into five steps:
  Creation of the model of the objects in CAD 3D;
  Sectioning of the model in layers;
  Conversion of the map of each layer into instructions for the machine;
  Formation of the object by depositing successive layers of cement material;
  Recovery of the object.

The object, designed as a CAD 3D model, is converted into an STL format file and cut into layers of the desired thickness. The printing path of each layer is then generated to create a G-Code printing file. The preparation of the cementitious material involves mixing and placing the material itself in a suitable container. Once the fresh material has been introduced into the container, it can be transported through a pump-tubing-nozzle system to print cementitious filaments, which can thus construct the desired object, layer by layer. This process has the advantage of allowing the deposition of material only in the spaces provided by the 3D model, unlike traditional building technologies, and the possibility of creating multi-material objects. However, the disadvantage of this method, on the other hand, could be the need for identifying a suitable supporting technique for creating complex objects.

3D printing of cementitious materials, using the extrusion technique, appeared for the first time in 2007, thanks to the research team of the University of Loughborough (United Kingdom) [4]. This research group presented for the first time the potential of using cementitious materials in AM, focusing on some critical aspects, such as the production of large objects, the complexity of the formulations, the need for identifying the correct rheological and mechanical properties of the same during printing and curing, the need for ensuring sufficient adhesion of the intermediate layers. The result of these studies led to the creation of a 3D printer for cementitious materials, which extrudes a mixture with high performances under the control of the computer. This 3D printer makes it possible to produce objects such as complex structural components, curved cladding panels and particular architectural elements.

The main characteristics for evaluating whether a cementitious material is suitable as a material for 3D extrusion printing, now widely identified and defined, are the following [5]:
  Extrudability: i.e. the characteristic that allows the material to flow easily through the nozzle. This characteristic is controlled by the correct balance between pumping power, extrusion flow-rate and geometry of the nozzle;
  Processability time of the material (open time): i.e. the time that passes from the preparation of the material to when it is too viscous to be correctly extruded in the 3D printing process;

Buildability: i.e. the capacity of the material in the fresh state of supporting the weight of the upper layers, which is a property that depends on the rheology of the material, but also on the adhesion between the layers.

The right balance must be found for obtaining the right formulation as these characteristics are antithetical. For this reason, it is essential to identify suitable additives, as well as the correct dispersion of the aggregates in the cement matrix, in order to optimize the formulation.

Other significant examples in the field of AM extrusion applied to the cement sector are the following:

University of South California: this has developed a manufacturing technology called Contour Crafting (CC, which uses computer control to create smooth and precise surfaces, both planar and of any form [6]. Even if the technique is based on the 'extrusion of AM materials, it is a hybrid method that combines an extrusion process for the formation of the surfaces of the object and a filling process (pouring or injection) to build the core of the object, also using standard industrial materials [7]. The extrusion process only constructs the outer edges (circles) of each level of the object. After the complete extrusion of each closed section of a given layer, if necessary, the filling material can be poured to fill the area defined by the extruded edges. The application of the CC in the construction of buildings is effected by a trestle structure that carries the nozzle and moves it on two parallel lanes installed on the construction site. [8];

WinSun: is a company that uses large 3D printers that extrude a mixture of fast-drying cement and recycled materials [9]. The technology is based on the AM extrusion technique and uses a CAD design as a model. A computer controls a mechanical extruder arm to deposit the cementitious material, which is treated with hardeners so that each layer is solid enough to support the next one, producing one wall at a time. The pieces are then subsequently joined together, directly at the building site;

University of Technology of Eindhoven: this research group has studied a new model of 3D concrete printing technology, which, like other machines (such as the Contour Crafting printer), looks like a crane. It is therefore a non-portable machine, with an adjustable printer head, with concrete mixing, a pump and a printing volume of 11×5×4 m$^3$.

Over the years, specific cementitious formulations have been developed to be printed by suitable 3D printers and some of these have also been patented. In this respect, with regard to formulations based on cement, the documents CN104310918, CN201510838044A, WO2017/050421A1, US2014/0252672A1 can be mentioned. With respect to the extrusion technology applied to this sector, the most significant patents/patent applications are the result of the above-mentioned research centres, and U.S. Pat. Nos. 7,641,461B2, 7,837,378B2, 7,878,789B2 and 7,753,642B2 and the application EP18180993.0 not yet published, can be cited by way of example.

Although specific cementitious formulations/mixtures have been developed to be printed by 3D printers, the need for identifying cement compositions that solve the problems relating to the following specificities is particularly felt:

the cementitious mixture to be printed by 3D by extrusion must be extrudable and buildable in the fresh state;

the 3D printer for cementitious mixtures must have special characteristics that are not found in printers currently on the market;

the cementitious mixtures of the state of the art have a poor mechanical strength at short deadlines, i.e. 24 hours.

In order to solve the technical problems considered above, the objectives of the present invention are:

identify specific cementitious mixtures, optimized in terms of simultaneous extrudability and buildability in the fresh state, in order to accurately reproduce a 3D model;

identify specific cementitious mixtures characterized by an improved mechanical strength at short deadlines, i.e. 24 hours;

re-design and print, with a plastic filament, some parts of a 3D printer to adapt it to processing/printing the desired cementitious mixtures.

The object of the present invention therefore relates to a cementitious mixture for a 3D printer which comprises a) cement or hydraulic binder, b) latent hydraulic addition, c) filler, d) aggregates, e) additives, f) water, said mixture being characterized in that component c) i.e. the filler, selected from calcareous, silica or silico-calcareous fillers, preferably calcareous fillers, alone or in a mixture, has a particle size which is such that at least 90% by weight of the filler passes through an 0.063 mm sieve;

component d) is present in a quantity ranging from 10% to 80% by weight, preferably from 25% to 50% by weight, with respect to the total weight of the cementitious mixture, and is composed of calcareous, silica or silico-calcareous aggregates, alone or mixed with each other, having a particle size with a maximum diameter lower than 1 mm, said component d) being composed of one or more fractions having a particle size with a diameter greater than 0.2 mm, preferably with a diameter greater than 0.6 mm, and a fraction having a particle size with a diameter less than or equal to 0.2 mm and such that less than 2% by weight passes through a sieve of 0.063 mm;

component e) comprises superfluidifying additives, rheology modifiers, shrinkage reducing agents, hydrophobing agents and mixtures thereof, said cementitious mixture being characterized by a viscosity value ranging from 80,000 Pa·s to 150,000 Pa·s, measured at a shear rate of 0.01 s$^{-1}$ and at a temperature of 20° C.

The viscosity is measured by a rheological method, with a rheometer having a controlled shear rate model Haake Rotovisco RV1 with coaxial cylinders, using a cylinder and a vane (4 blades), having a diameter of 41 and 22 mm respectively.

The materials of the present invention were characterized using a step method by varying the shear rate from a minimum value equal to 0.01 s$^{-1}$ to a maximum value of 10 s$^{-1}$ and at a temperature of 20° C. The total duration of the test, carried out at a temperature of 20° C., is 30 minutes in which the punctual data are collected at the desired rates.

The cementitious mixture for a 3D printer according to the invention preferably comprises a) from 10% to 70% by weight of hydraulic binder or cement, preferably selected from Portland cement, sulfoaluminate cement and/or aluminous cement and/or quick-setting natural cement, alone or mixed with each other;

b) from 0.5% to 25% by weight, preferably from 0.5% to 20% by weight, of a natural or artificial hydraulic addition, preferably granulated blast-furnace slag, having a specific surface ranging from 3,500 cm$^2$/g to 6,500 cm$^2$/g, determined according to the Blaine method according to EN 196-6:2010, preferably from 4,000 cm²/g to 5,000 cm²/g;

c) from 10% to 50% by weight, preferably from 15% to 40% by weight, of a filler, selected from calcareous, silica or silico-calcareous fillers, preferably calcareous fillers, alone or mixed with each other, having a particles size which is such that at least 90% by weight of the filler passes through a sieve of 0.063 mm;

d) from 10% to 80% by weight, preferably from 25% to 50% by weight, of calcareous, silica or silico-calcareous aggregates, alone or mixed with each other, having a particle size with a maximum diameter lower than 1 mm, said component d) being composed of one or more fractions having a particle size greater than 0.2 mm, preferably with a diameter greater than 0.6 mm, and a fraction having a particle size with a diameter less than or equal to 0.2 mm and such that less than 2% by weight passes through a sieve of 0.063 mm;

e) from 0.01% to 1.5% by weight, preferably from 0.2% to 1.0% by weight, of a superfluidifying additive selected from superfluidifying acrylic-based polycarboxylates, lignosulfonates, naphthalene sulfonates, melamine or vinyl compounds, more preferably polycarboxylic ethers; from 0.01% to 5.0% by weight, preferably from 0.10% to 0.50% by weight, of a rheology modifying additive, preferably cellulose, more preferably hydroxymethylethyl cellulose; from 0.01% to 2.0% by weight, preferably from 0.1% to 1.0% by weight, of modified starch; from 0.0% to 1.0% by weight, preferably from 0.3% to 0.6% by weight, of a shrinkage reducing agent, from 0.05% to 0.5%, preferably from 0.10% to 0.30% of a hydrophobing additive selected from silicone or silane derivatives and/or mixtures thereof, preferably an alkyloxysilane, wherein the binder/aggregate weight ratio ranges from 0.5 to 2.0, preferably from 0.62 to 1.36, the binder being composed of components a) and b) of the cementitious mixture, and said mixture has a viscosity value ranging from 80,000 Pa·s to 150,000 Pa·s, measured at a shear rate of 0.01 s$^{-1}$ and at a temperature of 20° C.

The percentages indicated above are percentages by weight with respect to the total weight of the cementitious mixture in powder form, i.e. excluding water.

In the cementitious mixture according to the present invention the water/binder weight ratio is within the range of 0.25 to 0.8, preferably from 0.4 to 0.6, wherein the binder is composed of components a) and b) of the cementitious mixture according to the invention.

In the cementitious mixture according to the present invention, the weight ratio water/total cementitious mixture in powder form is within the range of 17% to 20%, preferably from 17.5% to 19.3%.

The cementitious mixture according to the present invention is surprisingly characterized by an optimal balance of the properties of interest: it guarantees at the same time, in fact, a good buildability, extrudability and processability time, thus being particularly suitable for deposition by extrusion 3D printing. It is also characterized by an improved mechanical strength at short deadlines, i.e. 24 hours.

This optimization has been surprisingly achieved thanks to the specific combination of suitable additives, a precise dispersion of the aggregates with specific dimensions in the binder matrix and a specific viscosity range.

It should be remembered, in fact, that from a rheological point of view the relevant parameters go in exactly opposite directions: the material in the fresh state must have a viscosity that guarantees that it be correctly extruded, but at the same time that allows it to sustain itself during the printing process, in order to guarantee the realization of the 3D object designed.

Consequently, in order to coexist, the extrudability and buildability require a correct compromise in terms of rheological properties, as they have an opposing influence on these two parameters.

The concept of buildability should not be confused with the green strength, defined as the strength of the unhardened cement material in order to maintain its original form until the material starts to set and the hydration products provide sufficient mechanical strength [10].

The cement mixture described must be capable of being self-supporting once it has been deposited (buildability concept) during the whole moulding process layer by layer. This property, as already mentioned, depends mainly on the rheological behavior of the material and, at the same time, on the adhesion between the layers.

The cement mixture for 3D printing even more preferred according to the present invention is composed of:

a) from 10% to 70% by weight of hydraulic binder or cement, selected from CEM I 52.5 R or CEM I 52.5 N, preferably CEM I 52.5 R;

b) from 0.5% to 20% by weight of granulated blast-furnace slag, having a specific surface ranging from 4,000 cm²/g to 5,000 cm²/g, determined according to the Blaine method according to EN 196-6:2010;

c) from 15% to 40% by weight of a calcareous filler, alone or in a mixture, having a particles size which is such that at least 90% by weight of the filler passes through a sieve of 0.063 mm:

d) from 25% to 50% by weight of calcareous, silica or silico-calcareous aggregates, alone or in a mixture, having a particle size with a maximum diameter lower than 1 mm, said component d) being composed of one or more fractions having a particle size greater than 0.2 mm, preferably with a diameter greater than 0.6 mm, and a fraction having a particle size with a diameter less than or equal to 0.2 mm and such that less than 2% by weight passes through a sieve of 0.063 mm;

e) from 0.2% to 1.0% by weight of a superfluidifying additive based on polycarboxylic ether; from 0.10% to 0.50% by weight of a rheology modifying additive which is hydroxymethylethyl cellulose; from 0.1% to 1.0% by weight of modified starch; from 0.3% to 0.6% by weight of a shrinkage reducing agent, from 0.1% to 0.30% of a hydrophobing additive selected from silicone or silane derivatives and/or mixtures thereof, preferably an alkyloxysilane, more preferably a triethoxyoctyl-silane;

wherein the binder/aggregate weight ratio ranges from 0.62 to 1.36, wherein the binder is composed of components a) and b), and said cementitious mixture has a viscosity value ranging from 80,000 Pa·s to 150,000 Pa·s, measured at a shear rate of 0.01 s$^1$ and at a temperature of 20° C.

In the present description, the term "cement or hydraulic binder" refers to a material in powder form which, in the case of mixing with water, forms a paste which hardens by hydration and which, after hardening, maintains its strength and stability even under water. The hydraulic binder or cement of the cementitious mixture according to the present invention is preferably selected from Portland cement, sulfoaluminate cement and/or aluminous cement and/or natural quick-setting natural cement. These cements can also be used in a mixture with each other. The Portland cement according to the present invention is I 42.5 or 52.5 strength Portland cement, with an initial ordinary (N) or high (R) resistance class, according to the standard EN 197-1: 2011. The preferred cement it is CEM I 52.5 R or CEM I 52.5 N, even more preferred CEM I 52.5R.

In the present description the term "latent hydraulic addition" means a natural or artificial hydraulic addition, preferably a granular blast furnace slag (GGBS: "ground grain ground slag"), having a specific surface ranging from 3,500 cm$^2$/g to 6,500 cm$^2$/g, preferably from 4,000 cm$^2$/g to 5,000 cm$^2$/g, determined according to the Blaine method according to EN 196-6: 2010. The latent hydraulic addition is added to the formulation to improve the processability of the material. When present, this type of addition forms part of the binder, consequently the binder in the binder/aggregate and water/binder ratio is given by the sum of the cement or hydraulic binder and the latent hydraulic addition (or GGBS).

In the present description, the term "filler" is defined in accordance with the standard UNI EN 12620-1: 2008 as an aggregate, characterized by having a particle size which is such that approximately 90% of the filler passes through a 0.063 mm sieve. It can be added to building materials to give various properties. The filler according to the present invention is selected from calcareous, siliceous or silico-calcareous fillers, preferably calcareous, alone or in a mixture.

In the present description, the term "aggregate" refers to calcareous, siliceous or silico-calcareous aggregates which are known and commonly available products. Aggregates for use in cementitious compositions are defined in the standard UNI EN 206: 2014 as a natural, artificial, reclaimed or recycled granular mineral constituent suitable for use in concrete.

Aggregates are normally used for obtaining greater strength, a lower porosity and a decrease in efflorescence. In the present invention, the aggregates have a particle size with a maximum diameter of less than 1 mm.

The aggregates in the cementitious mixture according to the present invention also comprise a fraction having a particle size with a diameter ranging from 0.00 mm to 0.20 mm. This particle-size range can be seen from the technical data sheet of this fraction, which is commercially called "Impalpable". This fraction therefore has a particle size with a diameter less than or equal to 0.2 mm and such that less than 2% by weight passes through a 0.063 mm sieve. The aggregates in the cementitious mixture according to the present invention are therefore composed of one or more fractions having a particle size with a diameter greater than 0.2 mm, preferably with a diameter greater than 0.6 mm, and a fraction having a particle size with a diameter less than or equal to 0.2 mm and such that less than 2% by weight passes through a 0.063 mm sieve.

In the present description, the term "additives" refers to different types of additives which, in the cementitious mixture according to the present invention, allow an optimized cementitious mixture for 3D printing to be obtained. Combined with the specific dispersion and size of the aggregates, they guarantee, in fact, a synergistic effect of a good construction rate, extrudability, processability time, processability and development of mechanical properties. The superfluidifying agent is an additive that is added to improve the processability of the product without increasing the water content. Among these, an acrylic-based polycarboxylated superfluidifying additive is preferred, dosed according to the temperature of the mixture, the ambient temperature and degree of fluidity required in the formulation. Other possible superfluidifying additives are lignin sulfonates, naphthalene sulfonates, melamine or vinyl compounds, the most preferred are polycarboxylic ethers. A further additive in the cementitious mixture according to the present invention is the "rheology modifier", i.e. a substance which, if present in a cementitious composition, is able to modify the rheological properties in the fresh state and the adhesion to the substrate. This additive is added to this type of formulations to increase the viscosity of the product in order to avoid segregation. Cellulose derivatives such as cellulose, more preferably hydroxymethylcellulose, hydroxyethylcellulose, hydroxymethylpropylcellulose, carboxymethylcellulose are preferred rheology modifiers according to the present invention. The cementitious mixture according to the present invention can also comprise, as additives, derivatives of starch used for influencing the consistency of the mortars and improving the processability of the formulation. These compounds are chemical starches modified with ether groups that are applied in the building industry, in particular in plasters based on gypsum, cement and lime.

Another preferred additive to be added is the shrinkage reducing agent, also known as SRA, which includes a wide variety of glycols and polyols and is responsible for reducing shrinkage deformation throughout the operating life of the hardened product. A further additive to be added to the mixture is the hydrophobing agent which reduces the water absorption of the product, improving its durability. This greater durability of the finished product is therefore due to the presence of the hydrophobing agent which limits the action of water and any atmospheric agents. In order to obtain this effect, the molecules at the base of this additive are mainly based on silicones, silanes, and/or mixtures thereof, preferably based on alkyl-oxysilane, even more preferably triethoxyoctyl-silane.

An object of the present invention also relates to the use of the cementitious mixtures according to the present invention as extrusion material in a 3D printer.

A further object of the present invention also relates to a 3D printing process comprising the following steps:
 preparation of the cementitious mixture according to the present invention;
 feeding the cementitious mixture to a 3D printing apparatus;
 extrusion of the cementitious mixture from the 3D printer by means of a single-screw extruder;
 printing the 3D model by the deposition of consecutive layers of cementitious mixture;
 the ratio between the maximum diameter of the aggregates of the cementitious mixture and the distance between screw and internal wall of the extruder ranging from 0.02 to 0.8, preferably from 0.3 to 0.8.

An object of the present invention also relates to an apparatus suitable for implementing the printing process of a 3D object fed with a cementitious mixture according to the present invention, said apparatus comprising a cylindrical gas-pressurized supply tank, a screw extruder, a flexible tube which connects the tank to the extruder and a pumping system, wherein the extruder is a single-screw extruder provided with an extrusion chamber and a circular nozzle, the difference between the internal diameter of the extrusion chamber and the diameter of the screw ranging from 1.25 mm to 3.33 mm.

More specifically, the above-mentioned apparatus is part of a 3D printer, with which an object, previously designed by specific software, is produced using the cementitious mixture according to the present invention. Said apparatus comprises a cylindrical gas-pressurized supply tank, a screw extruder and a flexible tube which connects the tank to the extruder. The pumping system can be any pumping system known in the art, but preferably in the present apparatus a piston is used for pushing the cementitious mixture, contained inside the supply tank. The cementitious mixture is thus fed through a flexible tube to the single-screw extruder mounted on the print head. The extruder is provided with a circular nozzle.

More specifically, in the 3D printing process according to the present invention, the cementitious mixture is fed by means of a flexible tube to an extruder of a 3D printer which allows an extruded item to be produced positioned in the printing area of the same.

This extruder is composed of three parts, i.e. a screw, a nozzle and the body of the extruder; in particular the screw and the nozzle can be interchangeable depending on the formulation to be processed. The extruder is characterized by a screw having a height ranging from 35 to 140 mm, preferably from 40 to 80 mm, a pitch ranging from 7 to 30 mm, preferably from 8 to 22 mm, and a helix angle ranging from 12° to 43°, preferably from 14° to 26°, a nozzle with a diameter ranging from 2 to 30 mm, preferably from 7 to 20 mm, and a height of the nozzle ranging from 5 to 50 mm, preferably from 10 to 40 mm.

The above-mentioned extruder allows cementitious mixtures according to the present invention to be deposited, and specifically mixtures which comprise aggregates having a particle size with a maximum diameter of less than 1 mm and a viscosity value ranging from 80,000 Pa·s to 150,000 Pa·s, measured at a shear rate of $0.01\ s^{-1}$ and at a temperature of 20° C.

Furthermore, the ratio between the maximum diameter of the aggregates and the distance between the screw and the inner wall of the extruder (referring to the difference between the internal diameter of the extrusion chamber and the diameter of the screw (flight clearance) must range from 0.02 to 0.8, preferably must range from 0.3 to 0.8.

This ratio discriminates the capacity of extruding aggregates with a certain value of the maximum diameter within the extruder itself.

A further object of the present invention relates to a finished product with a complex geometry obtained by 3D printing with an apparatus fed with the cementitious mixture according to the present invention.

In the attached figures

As previously indicated, the main components of the apparatus for carrying out the 3D printing process, to which the cementitious mixture according to the present invention is fed, to be subsequently extruded and deposited, are the following:

1) cylindrical supply tank, gas pressurized;
2) flexible tube connecting the tank to the extruder;
3) screw extruder;
4) nozzle with circular outlet.

The extrusion device can be mounted on any type of machine or robot that can receive it, so as to combine the extrusion process with the specific advantages relating to the kinematics of the machine/robot.

Figure 4A:
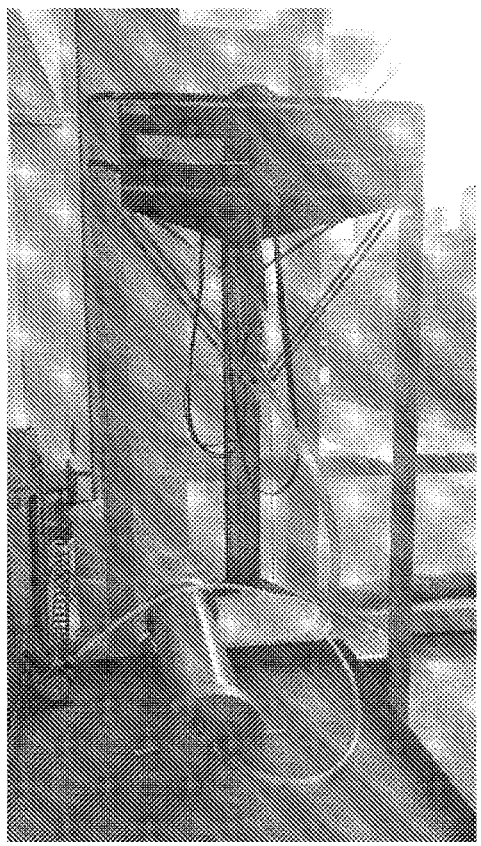
FIGS. 4A and 4B are a photographic reproduction of the main components that make up the apparatus for carrying out the 3D printing process.
Figure 4B:
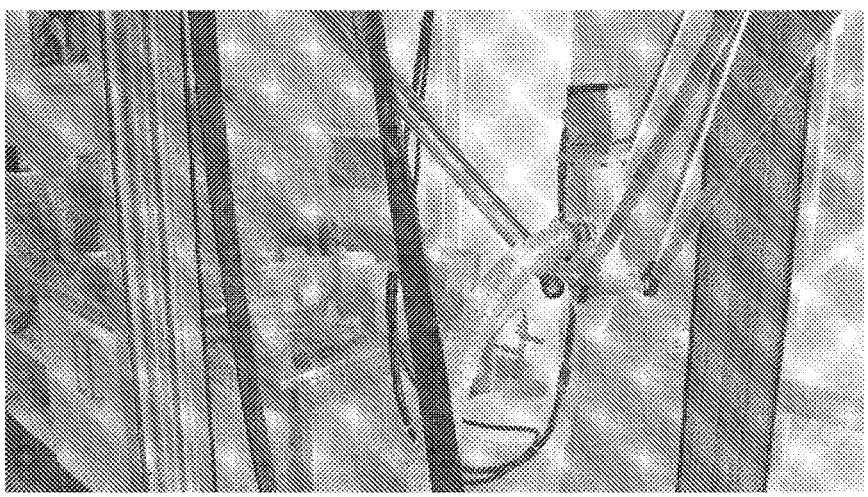

More specifically:

FIG. 4 shows the cylindrical gas-pressurized supply tank (1) which contains a piston which pushes the fluid, i.e. the cementitious mixture. The pressure is supplied by pressurized air, directly connected to the tank and regulated by a pressure gauge.

The flexible plastic tube (2) that connects the pump-tank system (1) to the extruder (3) is characterized by a circular section, with an internal diameter of 20 mm and a length ranging from 1.5 to 3 m.

Figure 1:
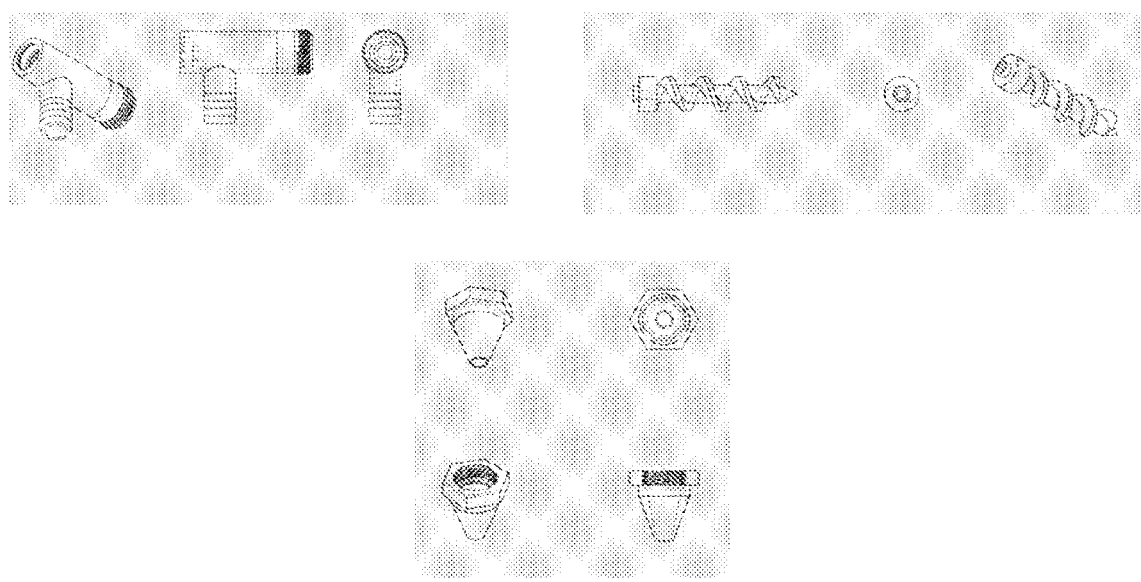
FIG. 1 is a schematic representation of an extruder for extruding the cementitious mixture according to the present invention.

The single-screw extruder (3) has been optimized for application with the cementitious mixture according to the present invention and is schematically shown in FIG. 1.

All the parts of the extruder are made of ABS (acrylonitrile-butadiene-styrene) and are in turn printed using a 3D printer capable of processing polymeric materials. The only exception with respect to the plastic parts of the extruder is the metal shaft.

The screw was printed with a hole in which the shaft was glued and a bearing was mounted on the screw to limit friction. The screw was printed in a vertical position to ensure adherence to the surface of the printing area during the process; supporting structures (in the shape of a triangle) are provided so that the screw having the desired geometry can be correctly printed. The rotation rates supported by the screw range from 90 to 180 rpm.

The diameter of the nozzle is 10 mm and the nozzle is designed to be interchangeable, cone-shaped to reduce the friction of the cementitious mixture.

The diameter of the nozzle can vary depending on the formulation, for this reason it was therefore conceived as interchangeable.

The printing parameters can be controlled with various types of software. This software allows the object designed to be divided into sections governed by the printing resolution to be obtained. In particular, the object to be printed is designed by creating a 3D digital model using a CAD application, and is then divided into layers using the above-mentioned software, subsequently providing the machine with instructions and establishing the path (layer by layer) that the nozzle must follow in order to build the object. The software for dividing the object into layers has generally been created to manage materials such as plastic or metal and therefore it does not allow some important parameters, such as for example the screw rate, to be controlled directly.

In order to control the screw rate (and therefore the flow-rate of the extruded material), an approach was followed similar to the control model of plastic extrusion. The first step is to calculate the flow-rate required for printing the object. This is the product of the height of the extruded layer, the diameter of the nozzle and the speed of the print head. Therefore, once the value of the flow is known, the rotation rate of the screw can be calculated using the following equations of a model of a single-screw extruder:

$$\begin{cases} Q = A*N + B*\dfrac{\Delta P}{\mu} \\ Q = k*\dfrac{\Delta P}{\mu} \end{cases}$$

wherein N is the rotation rate of the screw in rpm, $\Delta P$ is the increase in pressure inside the extrusion chamber, $\mu$ is the viscosity of the cementitious mixture (assuming that, under conditions of high flow stress, it behaves as a Newtonian fluid), A and B are functions of the geometry of the extruder and k is a function of the geometry of the nozzle.

The screw is moved by the same motor that pushes the polymer thread into the extruder for the polymeric materials. The rotation of the motor must ensure a sufficient flow-rate for supplying the polymer to the extruder and therefore its rate depends on the diameter of the thread. By supplying the software with the correct value of this diameter, the speed of the motor of the screw extruder can be defined.

In the case of the cementitious mixtures object of the present invention, a much higher value of the thread diameter than that of a plastic thread must be imposed on the software, to correctly use the nozzle with the desired diameter and obtain the right flow-rate necessary for printing materials of this type. This expedient is necessary for imposing the right rotation rate (rpm) on the extruder screw. It is also possible to change the diameter of the thread to increase the flow-rate and therefore the printing rate.

The examples provided hereunder aim at demonstrating the efficiency or otherwise of cementitious compositions according to the present invention, when processed by means of a 3D printing apparatus.

EXAMPLE 1

A formulation of a cementitious mixture having the composition shown in the following Table 1 was prepared using a Hobart mixer, according to the following procedure:
the solid components were mixed for 1 minute and 30 seconds at a speed of 140 rpm;
water was then added for 1 minute at a speed of 140 rpm;
all the components were then further mixed for 2 minutes at a speed of 285 rpm and subsequently for 1 minute at a speed of 322 rpm;
the mixing was interrupted for 45 seconds to collect any material remaining on the walls of the container:
all the components were then mixed for 1 minute at a speed of 322 rpm and then for 1 minute at a speed of 240 rpm.

TABLE 1

Formulation extruded according to Example 1.

| Component | Composition (weight %) |
|---|---|
| Cement I 52.5 R | 18.13% |
| GGBS | 17.50% |
| Calcareous Filler | 32.88% |
| Silico-calcareous sand (0.00-0.200 mm) | 20.0% |
| Silico-calcareous sand (0.600-1.000 mm) | 10.0% |
| Superfluidifying additive | 0.49% |
| Rheology modifier 1 | 0.3% |
| Rheology modifier 2 | 0.2% |
| Shrinkage reducing agent | 0.35% |
| Hydrophobic agent | 0.15% |
| Water/binder | 0.52 |
| Water/Total powder cementitious mixture | 18.55% |
| Binder/aggregate | 1.19 |

The cement is a cement of the type I 52.5 R cement from the Rezzato plant. The GGBS included in the formulation constitutes the latent hydraulic addition and is a granular blast furnace slag (GGBS: "ground grain ground slag"), having a specific surface equal to 4,450 cm$^2$/g (determined according to the Blaine method according to the standard EN 196-6: 2010), supplied by the company Ecocem with the trade-name of "Loppa di altoforno granulata macinata" (Ground granular blast furnace slag).

The calcareous filler is a high-purity filler, marketed by Omya Spa under the trade-name of Omyacarb 2-AV. The silico-calcareous aggregates were added in two fractions, a first fraction with a particle-size distribution ranging from 0.00 to 0.200 mm and a second fraction with a particle-size distribution ranging from 0.60000 to 1.000 mm.

The superfluidifying additive is based on polycarboxylic ether, called Melflux 2641 F, and marketed by BASF. The rheology modifier 1 is a hydroxymethylethylcellulose called "Tylose MH 60004 P6" marketed by ShinEtsu. The rheology modifier 2 is a starch modified with ether groups, marketed under the name Aqualon ST2000 from Ashland.

The shrinkage reducing agent (SRA), called SRA04, is marketed by Neuvendis; this is a mixture of glycols and special surfactants.

The hydrophobing agent is a silane-based additive, more precisely an alkyl oxysilane, called SEAL 200, marketed by Elotex.

These five additives are in solid form.

The water/binder ratio is equal to 0.52, the percentage referring to the weight ratio water/total cementitious mixture ratio in powder form is 18.55%, whereas the binder/aggregate ratio is equal to 1.19 (where the binder is composed of cement and the latent hydraulic addition GGBS).

At the end of the mixing, the cementitious mixture having the composition indicated in Table 1 was characterized by means of a Haake RotoVisco RV1 rheometer, with coaxial cylinders, at a temperature of 20° C. The test allowed the viscosity of the material to be characterized within a share rate range of 0.01 to 10 s$^{-1}$, using a step method. Each step was maintained for 30 seconds and the total duration of the test was 30 minutes. The viscosity of the cementitious mixture measured at a shear stress value of $0.01^{s-1}$ is equal to 100,000 Pa·s.

Figure 2:
FIG. 2 is a photographic reproduction of the pressurized tank, empty and full of cementitious mixture according to the present invention.

At the end of the mixing, the mortar was inserted into the cylindrical gas-pressurized supply tank (as shown in FIG. 2) with the help of a spatula and arranged so as to completely fill the container reducing the air trapped in the material as much as possible. The cylindrical gas-pressurized supply tank was thus prepared for being connected to the extruder mounted on the printing machine, using the tube previously described. The tank pressure was set at 5.0 bars.

Figure 3:
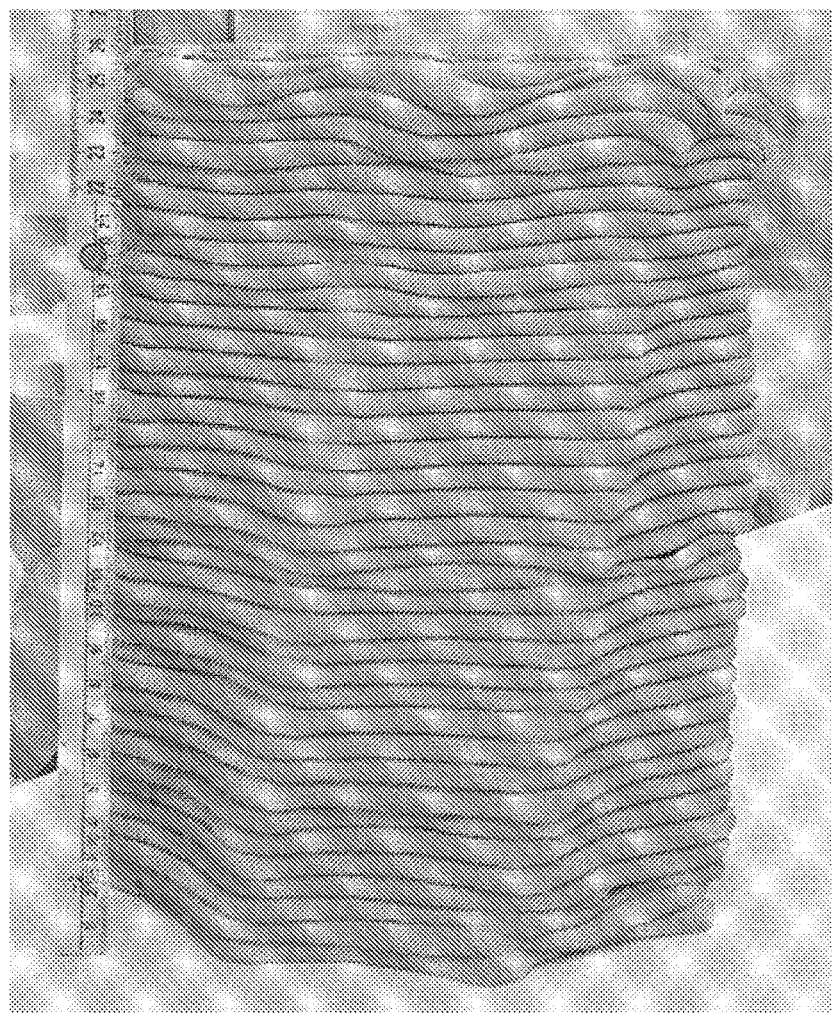
FIG. 3 is a photographic reproduction of the finished product having a complex geometry obtained according to example 1.

The mixture prepared as previously indicated was extruded using a triple-layered spiral path having a geometry deriving from an octagon. The 3D model to be printed was an octagonal element, inscribed in a circumference having a diameter of 23.6 cm and 25 cm high. The model was successfully printed (as shown in FIG. 3) in a single printing session, applying the following printing parameters:
Pressure at the cylindrical gas-pressurized supply tank: 5.0 bar;
Thread diameter imposed: 10 mm;
Height of layer: 7.0 mm;
Printing speed: 25 mm/s;
Screw rotation rate: 38.4 rpm;
Flight clearance: 1.5 mm
Ratio between maximum diameter of the aggregate and distance between the screw and the inner wall of the extruder: 0.67.

The mechanical resistance to compression at 24 hours was equal to 5.88 MPa, according to the loading ramp as described in EM 196-1-2016.

EXAMPLE 2

A formulation of a cementitious mixture having the composition shown in the following Table 2 was prepared using a Hobart mixer, according to the following procedure:

the solid components were mixed for 1 minute and 30 seconds at a speed of 140 rpm;

water was then added for 1 minute at a speed of 140 rpm;

all the components were then further mixed for 2 minutes at a speed of 285 rpm and subsequently for 1 minute at a speed of 322 rpm;

the mixing was interrupted for 45 seconds to collect any material remaining on the walls of the container all the components were then mixed for 1 minute at a speed of 322 rpm and then for 1 minute at a speed of 240 rpm.

TABLE 2

Formulation extruded according to Example 2.

| Component | Composition (weight %) |
|---|---|
| Cement I 52.5 R | 18.13% |
| GGBS | 17.50% |
| Calcareous filler | 32.88% |
| Silico-calcareous sand (0.00-0.200 mm) | 10.0% |
| Silico-calcareous sand (0.20-0.350 mm) | 10.0% |
| Silico-calcareous sand (0.600-1.000 mm) | 10.0% |
| Superfluidifying additive | 0.49% |
| Rheology modifier 1 | 0.3% |
| Rheology modifier 2 | 0.2% |
| Shrinkage reducing agent | 0.35% |
| Hydrophobic agent | 0.15% |
| Water/binder | 0.52 |
| Water/Total powder cementitious mixture | 18.55% |
| Binder/aggregate | 1.19 |

The cement is a cement of the type I 52.5 R cement from the Rezzato plant. The GGBS included in the formulation constitutes the latent hydraulic addition and is a granular blast furnace slag (GGBS: "ground grain ground slag"), having a specific surface equal to 4,450 cm$^2$/g (determined according to the Blaine method according to the standard EN 196-6: 2010), supplied by the company Ecocem with the trade-name of "Loppa di altoforno granulata macinata" (Ground granular blast furnace slag).

The calcareous filler is a high-purity filler, marketed by Omya Spa under the trade-name of Omyacarb 2-AV.

The silico-calcareous aggregates were added in two fractions, a first fraction with a particle-size distribution ranging from 0.00 to 0.200 mm and a second fraction with a particle-size distribution ranging from 0.60000 to 1.000 mm.

The superfluidifying additive is based on polycarboxylic ether, called Melflux 2641 F, and marketed by BASF. The rheology modifier 1 is a hydroxymethylethylcellulose called "Tylose MH 60004 P6" marketed by ShinEtsu. The rheology modifier 2 is a starch modified with ether groups, marketed under the name Aqualon ST2000 from Ashland.

The shrinkage reducing agent (SRA), called SRA04, is marketed by Neuvendis; this is a mixture of glycols and special surfactants.

The hydrophobic agent is a silane-based additive, more precisely an alkyl oxysilane, called SEAL 200, marketed by Elotex.

These five additives are in solid form.

The water/binder ratio is equal to 0.52, the percentage referring to the weight ratio water/total cementitious mixture ratio in powder form is 18.55%, whereas the binder/aggregate ratio is equal to 1.19 (where the binder is composed of cement and the latent hydraulic addition GGBS).

At the end of the mixing, the cementitious mixture having the composition indicated in Table 2 was characterized by means of a Haake RotoVisco RV1 rheometer, with coaxial cylinders, at a temperature of 20° C. The test allowed the viscosity of the material to be characterized within a share rate range of 0.01 to 10 s$^{-1}$, using a step method. Each step was maintained for 30 seconds and the total duration of the test was 30 minutes. The viscosity of the cementitious mixture measured at a shear stress value of $0.01^{s-1}$ is equal to 100,000 Pa·s.

At the end of the mixing, the mortar was inserted into the cylindrical gas-pressurized supply tank (as shown in FIG. 2) with the help of a spatula and arranged so as to completely fill the container reducing the air trapped in the material as much as possible. The cylindrical gas-pressurized supply tank was thus prepared for being connected to the extruder mounted on the printing machine, using the tube previously described. The tank pressure was set at 5.0 bars.

The mixture prepared as previously indicated was extruded using a triple-layered spiral path having a geometry deriving from an octagon. The 3D model to be printed was an octagonal element, inscribed in a circumference having a diameter of 23.6 cm and 25 cm high. The model was successfully printed in a single printing session, applying the following printing parameters:

Pressure at the cylindrical gas-pressurized supply tank: 5.0 bar;

Thread diameter imposed: 10 mm;

Height of layer: 7.0 mm;

Printing speed: 25 mm/s;

Screw rotation rate: 38.4 rpm;

Flight clearance: 1.5 mm

Ratio between maximum diameter of the aggregate and distance between the screw and the inner wall of the extruder: 0.67.

The mechanical resistance to compression at 24 hours was equal to 5.01 MPa, according to the loading ramp as described in EM 196-1-2016.

COMPARATIVE EXAMPLE 3

A formulation of a cementitious mixture having the composition shown in the following Table 3 was prepared using a Hobart mixer, according to the procedure described in Example 1.

TABLE 3

Formulation extruded according to Example 3.

| Component | Composition (weight %) |
|---|---|
| Cement I 52.5 R | 15.0% |
| GGBS | 15.0% |
| Calcareous filler | 27.9% |
| Silico-calcareous sand (0.200-0.350 mm) | 8.0% |
| Silico-calcareous sand (0.600-1.000 mm) | 18.1% |
| Silico-calcareous sand (1.000-1.500 mm) | 15.0% |
| Superfluidifying additive | 0.55% |
| Rheology modifier 1 | 0.22% |
| Rheology modifier 2 | 0.23% |
| Water/binder | 0.54 |
| Water/Total powder cementitious mixture | 16.20% |
| Binder/aggregate | 0.73 |

The cement is a cement of the type I 52.5 R cement from the Rezzato plant. The GGBS included in the formulation constitutes the latent hydraulic addition and is a granular blast furnace slag (GGBS: "ground grain ground slag"), having a specific surface equal to 4,450 cm$^2$/g (determined according to the Blaine method according to the standard EN 196-6: 2010), supplied by the company Ecocem with the trade-name of "Loppa di altoforno granulata macinata" (Ground granular blast furnace slag).

The calcareous filler is a high-purity filler, marketed by Omya Spa under the trade-name of Omyacarb 2-AV.

The silico-calcareous aggregates were added in three fractions, a first fraction with a particle-size distribution ranging from 0.200 to 0.0.350 mm, a second fraction with a particle-size distribution ranging from 0.600 to 1,000 mm and a third fraction with a particle-size distribution ranging from 1,000 to 1,500 mm.

The superfluidifying additive is based on polycarboxylic ether, called Melflux 2641 F, and marketed by BASF. The rheology modifier 1 is a hydroxymethylethylcellulose called "Tylose MH 60004 P6" marketed by ShinEtsu. The rheology modifier 2 is a starch modified with ether groups, marketed under the name Aqualon ST2000 from Ashland. These three additives are all in solid form.

The water/binder ratio is equal to 0.54, the percentage referring to the weight ratio water/total cementitious mixture ratio in powder form is 16.20%, whereas the binder/aggregate ratio is equal to 0.73 (wherein the binder is composed of cement and the latent hydraulic addition GGBS).

At the end of the mixing, the cementitious mixture having the composition indicated in Table 3 was characterized by means of a Haake RotoVisco RV1 rheometer, by means of the method already described in Example 1. The viscosity of the cementitious mixture measured at a shear stress value of $0.01^{s-1}$ is equal to 100,000 Pa·s.

At the end of the mixing, the mortar was inserted into the cylindrical gas-pressurized supply tank which was connected to the extruder mounted on the printing machine, as described in Example 1. The tank pressure was set at 5.0 bars.

The mixture prepared as previously indicated was extruded using a triple-layered spiral path having a geometry deriving from an octagon. The 3D model to be printed was an octagonal element, inscribed in a circumference having a diameter of 23.6 cm and 250 cm high.

The model was printed applying the same printing parameters indicated for Example 1, in which, however, the value of the ratio between the maximum diameter of the aggregate and the distance between the screw and the inner wall of the extruder is equal to 1.0.

The mixture prepared as indicated above was not processable. Although having a viscosity value included within the range provided by the present invention, the formulation, in fact, provides a maximum diameter of the aggregates outside the maximum limit of the range provided by the same and also a ratio between the maximum diameter of the aggregate and the distance between the screw and internal wall of the extruder not included within the range provided by the invention.

The value of the mechanical resistance to compression at 24 hours was equal to 3 MPa, according to the loading ramp as described in EM 196-1-2016.

BIBLIOGRAPHY

[1] "*Additive manufacturing—Turning manufacturing inside out*", Peter Wray, American Ceramic Society Bulletin, Vol. 93, No. 3, 2014.
[2] ASTM Standard F2792-12a.
[3] S. Lim, R. A. Buswell, T. T. Le, S. Austin, A. G. Gibb, T. Thorpe, "*Development in construction-scale additive manufacturing process*", 2012, Automation Construction, 21:262268.
[4] R. A. Buswell, R. C. Soar, A. G. F. Gibb, A. Thorpe, "*Freeform construction: mega-scale rapid manufacturing for construction*", 16, 2007, Automation in Construction, p. 224-231.
[5] T. T. Le, S. A. Austin, S. Lim, R. A. Buswell, A. G. F. Gibb, T. Thorpe, "*Mix design and fresh properties for high-performance printing concrete*", 45, 2012, Materials and Structures, p. 1221-1232.
[6] B. Khoshnevis, D. Hwang, K. T. Yao, Z. Yeh, "*Mega-Scale fabrication by contour crafting*", Industrial and Systems Engineering international journal, Vol. 1, No. 3, 301-320, 2006.
[7] D. Hwang, B. Khoshnevis, "*Concrete wall fabrication by contour crafting*", proceedings of the 21st International Symposium on Automation and Robotics in Construction (ISARC 2004), Jeju, South Korea, 2004.
[8] B. Khoshnevis, "*Automated construction by contour crafting-related robotics and information technologies*", Automation in Construction, Vol. 13, No. 1, 5-19, 2004.
[9] Frankson, Lies, "*Printing your dream house: innovations in construction*", IMIESA, Vol. 40, No. 4, 33-34, 2015.
[10] Husken G., Brouwers H. J. H, "*On the early-age behavior of zero-slump concrete*", Cement and Concrete Research 42 (2012) 501-510.

The invention claimed is:
1. A cementitious mixture for a 3D printer which comprises:
   a) from 10% to 70% by weight of a cement or hydraulic binder,
   b) from 0.5% to 25% by weight with respect to the total weight of the cementitious mixture of a natural or artificial latent hydraulic addition having a specific surface ranging from 3,500 cm2/g to 6,500 cm2/g, determined according to the Blaine method according to EN 196-6:2010,
   c) from 10% to 50% by weight of a filler,
   d) aggregates,
   e) additives,
   f) water, wherein:
   component c) conforms with standard UNI EN 12620-1: 2008 and is selected from calcareous, silica or silico-calcareous fillers, and mixtures thereof having a particle size wherein at least 90% by weight of the filler passes through an 0.063 mm sieve;
   component d) is present in a quantity ranging from 10% to 80% by weight with respect to the total weight of the cementitious mixture, and comprises calcareous, silica or silico-calcareous aggregates, in accordance with standard UNI EN 206: 2014, alone or mixed with each other, having a particle size with a maximum diameter lower than 1 mm, said component d) comprising an aggregate fraction having a particle size with a diameter greater than 0.2 mm and an aggregate fraction having a particle size with a diameter less than or equal to 0.2 mm and such that less than 2% by weight passes through a sieve of 0.063 mm;
   component e) comprises from 0.01% to 1.5% by weight of a superfluidifying additive selected from superfluidifying acrylic-based polycarboxylates, liposulfonates, naphthalene sulfonates, melamine or vinyl compounds from 0.01% to 5.0% by weight of a rheology modifying additive; from 0.01% to 2.0% by weight of modified starch; from 0.0% to 1.0% by weight of a shrinkage reducing agent: from 0.05% to

0.5% of a hydrophobic additive selected from silicone or silane derivatives and mixtures thereof, said cementitious mixture having a viscosity value ranging from 80,000 Pa·s to 150,000 Pa·s, measured at a shear rate of 0.01 s$^{-1}$ and at a temperature of 20° C., wherein the weight ratio between the binder and the aggregate ranges from 0.5 to 2.0, the binder comprising components a) and b) of the cementitious mixture.

2. The cementitious mixture according to claim 1, wherein a weight ratio between water and the binder ranges from 0.25 to 0.8, the binder comprising components a) and b) of the cementitious mixture.

3. The cementitious mixture according to claim 1, wherein a weight ratio between water and the total cementitious mixture in powder form is within the range of 17% to 20%.

4. The cementitious mixture according to claim 1, wherein component a) of the mixture is selected from the group consisting of CEM I 52.5 R and CEM I 52.5 N.

5. The cementitious mixture according to claim 1, wherein component b) of the mixture is granulated blast-furnace slag, having a specific surface ranging from 3,500 cm$^2$/g to 6,500 cm$^2$/g, determined according to the Blaine method according to EN 196-6:2010.

6. The cementitious mixture according to claim 1, wherein:
component a) is selected from the group consisting of CEM I 52.5 R and CEM I 52.5 N;
component b) is present in a quantity by weight from 0.5% to 20% and is granulated blast-furnace slag, having a specific surface ranging from 4,000 cm2/g to 5,000 cm2/g, determined according to the Blaine method according to EN 196-6:2010;
component c) is calcareous filler and is present in a quantity by weight from 15% to 40%;
component d) is present in a quantity by weight from 25% to 50%;
component e) comprises from 0.2% to 1.0% by weight of the superfluidifying additive based on polycarboxylic ether; from 0.10% to 0.50% by weight of a theology modifying additive which is hydroxymethylethyl cellulose; from 0.1% to 1.0% by weight of modified starch; from 0.3% to 0.6% by weight of a shrinkage reducing agent, from 0.1% to 0.30% of a hydrophobic additive selected from silicone or silane derivatives and mixtures thereof;
wherein the binder/aggregate weight ratio ranges from 0.62 to 1.36, wherein the binder components a) and b), and said cementitious mixture has a viscosity value ranging from 80,000 Pa·s to 150,000 Pa·s, measured at a shear rate of 0.01 s$^{-1}$ and at a temperature of 20° C.

7. A 3D printing process comprising the following steps:
preparing the cementitious mixture according to claim 1;
feeding the cementitious mixture to a 3D printing apparatus;
extruding the cementitious mixture from the 3D printer by means of a single-screw extruder;
printing a 3D model by the deposition of consecutive layers of the cementitious mixture;
wherein the ratio between a maximum diameter of the aggregates of the cementitious mixture and the distance between a screw and an internal wall of the screw extruder ranges from 0.02 to 0.8.

8. An apparatus suitable for implementing the printing process of a 3D object fed with the cementitious mixture according to claim 1, said apparatus comprising a cylindrical gas-pressurized supply tank, a screw extruder, a flexible pipe which connects the tank to the screw extruder and a pumping system, wherein the screw extruder is a single-screw extruder provided with a screw, an extrusion chamber and a circular nozzle, the difference between an internal diameter of the extrusion chamber and a diameter of the screw ranging from 1.25 mm to 3.33 mm.

9. The apparatus according to claim 8, wherein the screw extruder is characterized by the screw having a height ranging from 35 to 140 mm, a pitch ranging from 7 to 30 mm, a helix angle ranging from 12° to 43°, and the circular nozzle having a diameter ranging from 2 to 30 mm and a height ranging from 5 to 50 mm.

10. The cementitious mixture according to claim 1 wherein component (c) comprises a calcareous filler.

11. The cementitious mixture according to claim 1 wherein component (d) is present in a quantity ranging from 25% to 50% by weight with respect to the total weight of the cementitious mixture having a fraction having a particle size with a diameter greater than 0.6 mm.

12. The cementitious mixture according to claim 1 wherein the hydraulic binder or cement is selected from the group consisting of Portland cement, sulfoaluminate cement, aluminous cement, quick-setting natural cement, and mixtures thereof.

13. The cementitious mixture according to claim 1 wherein the natural or artificial hydraulic addition is from 0.5% to 20% by weight of the cementitious mixture and comprises a granulated blast-furnace slag, having a specific surface ranging from 4,000 cm2/g to 5,000 cm2/g determined by the Blaine method according to EN 196-6:2010.

14. The cementitious mixture according to claim 1 wherein the filler is from 15% to 40% by weight of the cementitious mixture, said filler comprising calcareous fillers.

15. The cementitious mixture according to claim 1 wherein the calcareous, silica or silico-calcareous aggregates, alone or mixed with each other, are from 25% to 50% by weight of the cementitious mixture, having a particle size with a maximum diameter lower than 1 mm, said component, d) being composed of one or more fractions having a particle size greater than 0.6 mm, and a fraction having a particle size with a diameter less than or equal to 0.2 mm and such that less than 2% by weight passes through a sieve of 0.063 mm.

16. The cementitious mixture according to claim 1 wherein the superfluidifying additive is from 0.2% to 1.0% by weight and comprises polycarboxylic ethers; the rheology modifying additive is from 0.10% to 0.50% by weight and comprises hydroxymethylethyl cellulose; the modified starch is from 0.1% to 1.0% by weight; the shrinkage reducing agent is from 0.3% to 0.6% by weight; the hydrophobic additive is from 0.10% to 0.30% and comprises an alkyloxysilane.

17. The cementitious mixture according to claim 1 wherein the binder/aggregate weight ratio ranges from 0.62 to 1.36.

18. The cementitious mixture according to claim 2, wherein the water/binder weight ratio ranges from 0.4 to 0.6.

* * * * *